United States Patent

Houvig et al.

[11] Patent Number: 5,708,701
[45] Date of Patent: Jan. 13, 1998

[54] POWER LINE TELEPHONE COMMUNICATIONS SYSTEM HAVING ON HOOK DIGITAL VOICEBAND MESSAGING

[75] Inventors: Felix Houvig, Wayne, Pa.; Chandrakant Bhailalbhai Patel, Hopewell, N.J.

[73] Assignee: Elcom Technologies Corporation, Malvern, Pa.

[21] Appl. No.: 503,190

[22] Filed: Jul. 17, 1995

[51] Int. Cl.$^6$ .............. H04M 1/60; H04M 9/00; H04M 11/04

[52] U.S. Cl. ............ 379/173; 379/170; 379/169; 379/65; 379/66; 340/310.01; 340/310.07

[58] Field of Search .............. 379/64, 65, 66, 379/142, 167, 168, 169, 170, 173; 340/310 CP, 310 A, 310 R, 310.01, 310.07, 310.08

[56] References Cited

U.S. PATENT DOCUMENTS

| | | |
|---|---|---|
| 3,949,172 | 4/1976 | Brown et al. |
| 4,058,678 | 11/1977 | Dunn et al. |
| 4,475,193 | 10/1984 | Brown |
| 4,479,033 | 10/1984 | Brown et al. |
| 4,495,386 | 1/1985 | Brown et al. |
| 4,514,594 | 4/1985 | Brown et al. |
| 4,523,307 | 6/1985 | Brown et al. |
| 4,701,945 | 10/1987 | Pedigo ............ 379/66 |
| 5,127,045 | 6/1992 | Cragun et al. ............ 379/66 |
| 5,530,737 | 6/1996 | Bartholomew et al. ............ 379/66 |
| 5,533,101 | 7/1996 | Miyagawa ............ 379/66 |

FOREIGN PATENT DOCUMENTS

| | | |
|---|---|---|
| 85/00488 | 1/1985 | WIPO |
| 94/22257 | 9/1994 | WIPO |

Primary Examiner—Curtis Kuntz
Assistant Examiner—Paul Loomis
Attorney, Agent, or Firm—Ratner & Prestia

[57] ABSTRACT

A power line telephone communications system having an ON HOOK digital voiceband messaging feature by which selected information contained in an incoming call to a telephone is received prior to the telephone being lifted off its hook. The incoming ring signals, ON HOOK digital voiceband messaging and information signals are conducted by a base unit to the power line for transmission to an extension unit to which a telephone is connected.

10 Claims, 2 Drawing Sheets

POWER LINE TELEPHONE COMMUNICATIONS SYSTEM HAVING ON HOOK DIGITAL VOICEBAND MESSAGING

TECHNICAL FIELD

The present invention relates, in general, to the communication of information by means of the power lines in a building and, in particular, to the transmission and reception of telephone signals in a power line communications system having the facility for the receiver of an incoming telephone call to receive information while the telephone remains ON HOOK and before the incoming telephone call is answered.

BACKGROUND OF THE INVENTION

Many subscribers to conventional telephone services have the facility to identify the origin of an incoming call when their telephone rings and before they lift their telephone off the hook. In this way, the subscribers are able to decide whether they wish to accept the call without first having to answer the call.

This telephone service is known as "caller ID."

The lines by which power is distributed in a building can be and are used for the transmission of information signals, such as telephone signals, to and between rooms within a building. The inclusion of "caller ID" in a power line communication system adapted for telephone communications is a very desirable feature.

SUMMARY OF THE INVENTION

A power line telephone communications system having ON HOOK digital voiceband messaging, constructed in accordance with the present invention, includes means for supplying first telephone signals transmitted from a telephone line for reception by a telephone and second telephone signals transmitted from the telephone for reception at the telephone line. The first telephone signals include ring signals indicating an incoming call to the telephone, ON HOOK digital voiceband signals representative of selected information, and first information signals representative of OFF HOOK communications from the telephone line. The second telephone signals including ON HOOK/OFF HOOK status signals indicating the status of the telephone and second information signals representative of OFF HOOK communications from the telephone. This power line telephone communications system also includes a power line along which the first telephone signals are transmitted for reception by the telephone and the second telephone signals are transmitted for reception at the telephone line. This power line telephone communications system further includes a base unit connected between the telephone line and the power line for conducting to the power line the first telephone signals and for receiving from the power line the second telephone signals and an extension unit connected between the power line and the telephone for receiving from the power line the first telephone signals and for conducting to the power line the second telephone signals. The base unit includes first detecting means responsive to the ON HOOK/OFF HOOK status signals for determining when the telephone is ON HOOK and when the telephone is OFF HOOK and a first information path responsive to the first detecting means for passing the ON HOOK digital voiceband signals to the power line when the telephone is ON HOOK. The extension unit, adapted for connection to an indicator which indicates the selected information of the ON HOOK digital voiceband signals, includes second detecting means responsive to the ON HOOK/OFF HOOK status signals for determining when the telephone is ON HOOK and when the telephone is OFF HOOK, and a second information path responsive to the second detecting means for passing the ON HOOK digital voiceband signals to the indicating indicator when the telephone is ON HOOK.

The present invention will be described in connection with a power line telephone communications system having caller identification as the selected information represented by the ON HOOK digital voiceband signals. It will be apparent, however, that the present invention has broader application and other information, such as calling card number and date and time of incoming call, can be represented by the ON HOOK digital voiceband signals.

In addition, it will be understood that the term "voiceband" not only applies to voice signals but also to data signals (e.g. facsimile transmissions) which are transmitted and received in the voice band. The term "voiceband" has its origin from the original use of the telephone to transmit and receive voice signals.

DETAILED DESCRIPTION OF THE INVENTION

Figure 1:
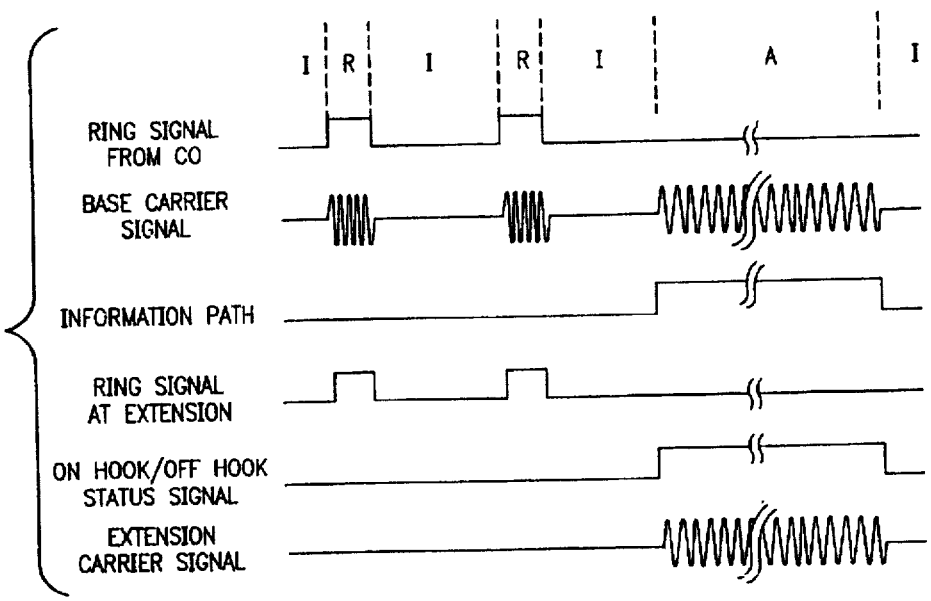
FIG. 1 is a number of waveform diagrams showing the signals transmitted and received by the base and extension units of a power line telephone communications system not having ON HOOK digital voiceband messaging.

To gain a better understanding of the present invention, it is useful to consider the transmission and reception of the signals transmitted and received by the base unit and the extension unit of a power line telephone communications system not having ON HOOK digital voiceband messaging before describing a power line telephone communications system, constructed in accordance with the present invention, having ON HOOK digital voiceband messaging. Referring to FIG. 1, prior to reception of a ring signal at a telephone line from the telephone central office, the various signals and circuit components identified in FIG. 1 (i.e. ring signal from the telephone central office, base carrier signal, information path, ring signal at extension, ON HOOK/OFF HOOK status signal, and extension carrier signal) are in an inactive state as indicated by first time period "T". Ringing at the extension is indicated by turning the base carrier signal "on" during the ring signals and "off" between the ring signals following the cadence of the telephone central office. This is indicated by the time periods "R" and the second and third time periods "T", respectively. During time periods "R", the base carrier signal, modulated by the ring signals, is transmitted from the base unit to the extension unit via the power line and the ring signal is detected at the extension unit to ring the telephone at the extension unit. So long as the telephone at the extension is ON HOOK, the ON HOOK/OFF HOOK status signal indicates that the telephone is ON HOOK, the base carrier signal is inactive between ring signals, and the information path and the extension carrier signal are inactive. When the telephone is lifted and is OFF HOOK, the ring signals stop, the ON HOOK/OFF HOOK status signal indicates that the telephone is OFF HOOK, and the information path, base carrier signal, and extension carrier signal become active as indicated by the time period "A". Information, whether voice or data, from the telephone line and the telephone modulates the base carrier signal and the extension carrier signal, respectively, as indicated by the time period "A". It will be understood that the ON HOOK/OFF HOOK status signal represents the absence or presence of the extension carrier signal which is absent when the telephone at the extension is ON HOOK and is present when the telephone at the extension is OFF HOOK. The absence or presence of the extension carrier signal is sensed at the base unit and the status of the telephone at the extension is, in turn, communicated along the telephone line to the telephone central office. When the presence of the extension carrier signal is sensed, ring signals are no longer transmitted from the telephone central office as indicated by the waveform diagrams of FIG. 1.

Figure 2:
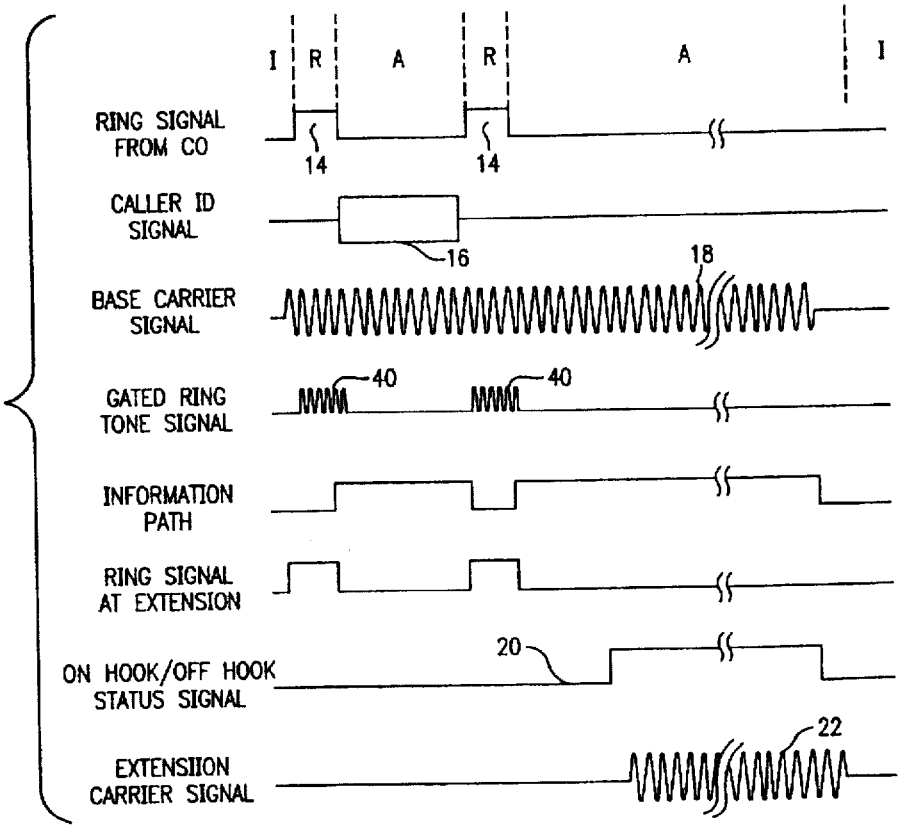
FIG. 2 is a number of waveform diagrams showing the signals transmitted and received by the base and extension units of a power line telephone communications system constructed in accordance with the present invention having ON HOOK digital voiceband messaging.

Referring to FIG. 2, which shows a number of waveform diagrams of the signals transmitted and received by the base and extension units of a power line telephone communications system constructed in accordance with the present invention having ON HOOK digital voiceband messaging, prior to reception of a ring signal along the telephone line from the telephone central office, the various signals and circuit components (i.e. ring signal from the telephone central office, caller identification signal, base carrier signal, information path, ring signal at extension, ON HOOK/OFF HOOK status signal, and extension carrier signal) are inactive as indicated by the first time period "T". In addition, a gated ring tone signal, added in accordance with one aspect of the present invention, is generated during the ring signals following the cadence of the telephone central office and, therefore, is inactive during the first time period "T". Ringing at the extension is indicated by turning the base carrier signal and the gated ring tone signal "on" at the first ring signal. This is indicated by the first time period "R". While the gated ring tone signal is generated only during the time that the ring signals are active, the base carrier signal remains "on" during and between the ring signals. During time periods "R", the base carrier signal, modulated by the gated ring tone signals, is transmitted from the base unit to the extension unit via the power line and the gated ring tone signals are detected at the extension unit to ring the telephone. Between the first and second ring signals, and while ON HOOK, digital voiceband signals, such as caller identification signals, are received, the base carrier signal, modulated by the ON HOOK digital voiceband signals, is transmitted from the base unit. This is indicated by the first time period "A". The ON HOOK digital voiceband signals are transmitted to the extension unit via the power line and are detected at the extension unit while the telephone remains ON HOOK.

Figure 3:
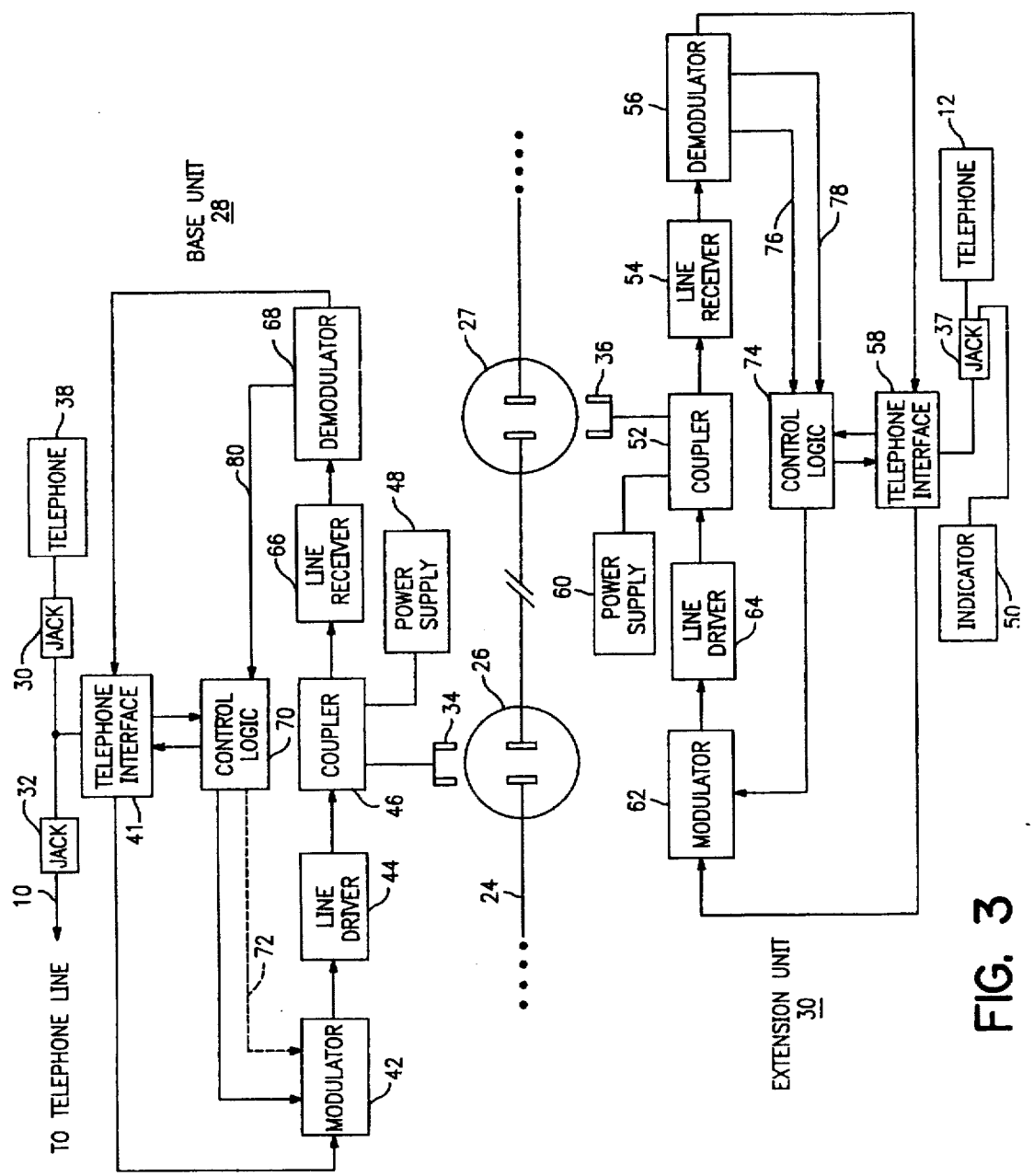
FIG. 3 is a block diagram of a power line telephone communications system constructed in accordance with the present invention.

Referring to FIG. 3, a power line telephone communications system having caller identification, constructed in accordance with the present invention, includes means, represented by a line 10, for supplying first telephone signals transmitted from a telephone line for reception by a telephone 12 and second telephone signals transmitted from the telephone for reception at the telephone line. As shown by the waveform diagrams of FIG. 2, the first telephone signals supplied along line 10 include ring signals 14 indicating an incoming call to telephone 12, caller identification signals 16 indicating the origin of an incoming call, and first information signals representative of OFF HOOK communications (e.g.) voice or data) from the origin of an incoming call and identified by reference numeral 18 in FIG. 2 at that portion of the modulated base carrier signal in the second time period "A" after the ON HOOK/OFF HOOK status signal indicates that the telephone is OFF HOOK. Preferably, the caller identification signals occur, as shown by FIG. 2, between the first and the second ring signals, so that the subscriber learns the origin of the incoming call as soon as possible. As shown by the waveform diagrams of FIG. 2, the second telephone signals transmitted from telephone 12 include ON HOOK/OFF HOOK status signals 20 indicating the status of the telephone and second information signals 22 representative of OFF HOOK communications (e.g. voice or data) from the telephone and shown by the modulated extension carrier signal in the second time period "A" after the ON HOOK/OFF HOOK status signal indicates that the telephone is OFF HOOK.

A power line telephone communications system, constructed in accordance with the present invention, also includes a power line 24 along which the first telephone signals are transmitted for reception by telephone 12 and the second telephone signals are transmitted for reception at telephone line 10. Disposed along power line 24 is a plurality of outlets 26 and 27.

A power line telephone communications system, constructed in accordance with the present invention, further includes a base unit 28 (shown above power line 24 in FIG. 3) connected between telephone line 10 and the power line for conducting to the power line the first telephone signals and for receiving from the power line the second telephone signals and an extension unit 30 (shown below power line 24 in FIG. 3) connected between the power line and telephone 12 for receiving from the power line the first telephone signals and for conducting to the power line the second telephone signals. Base unit 28 is connected to telephone line 10 by a telephone jack 32 and to power line 24 by a plug 34. Extension unit 30 is connected to power line 24 by a plug 36 and to telephone 12 by a telephone jack 37. Typically, a telephone 38 is connected to base unit 28 via a telephone jack 39.

The ring signal in standard telephone systems has a 170 peak-to-peak voltage and a frequency which can vary between 16 Mz and 120 Hz. This amplitude is too great for a system, such as one constructed in accordance with the present invention, in which the base carrier signal is to be modulated by the ring signal and the frequency is outside the voice band of such a system. Thus, in accordance with the present invention and as shown in FIG. 2, a gated ring tone signal 40 (i.e. a pseudo ring signal), having the desired amplitude and a frequency in the voice band of the system, is generated in base unit 28 for each ring signal 14. The base carrier signal is modulated by the gated ring tone signals and the modulated base carrier signal is conducted to power line 24 as the ring signal. The frequency of gated ring tone signal 40 is selected to be higher than the normal 60 Hz ring tone signal. Preferably, the frequency of the gated ring tone signals is at the upper end of the voice band frequency range, for example 3.5 KHz.

Caller identification signals 16, which are transmitted between the first and second ring signals 14, are indicated by FSK tones in the voice band. Because the caller identification signals are between the ring signals, base carrier signal 18 remains "on" between the ring signals and is modulated by the caller identification signals, The caller identification signals have the requisite frequency and desired amplitude and, therefore, can be used to modulate the base carrier signal.

Base unit 28 includes first detecting means responsive to ON HOOK/OFF HOOK status signals 20 for determining when telephone 12 is ON HOOK and when the telephone is OFF HOOK and a first information path for passing gated ring tone signals 40 and caller identification signals 16 to power line 24 when the telephone is ON HOOK and first information signals 18 to the power line when the telephone is OFF HOOK. The first detecting means activate the first information path when:

(1) telephone 12 is ON HOOK to pass gated ring tone signals 40 and caller identification signals 16 to power line 24, and (2) telephone 12 is OFF HOOK to pass first information signals 18 to power line 24.

For the embodiment of the invention illustrated in FIG. 3, the first information path includes a telephone interface 41 by which base unit 28 is matched to telephone line 10 to receive the first telephone signals from the telephone line through telephone jack 32; a modulator 42 at which gated ring tone signals 40, caller identification signals 16, and information signals 18 modulate the base carrier signal; a line driver 44 which amplifies the modulated base carrier signal; and a coupler 46 by which the base unit is matched to power line 24 to conduct the amplified, modulated base carrier signal through plug 34 and outlet 26 to the power line. A power supply 48 provides power to the various component parts of base unit 28.

Extension unit 30 is adapted for connection, through telephone jack 37, to an indicator 50 which indicates the origin of an incoming call. Extension unit 30 includes second detecting means responsive to the ON HOOK/OFF HOOK status signals for determining when telephone 12 is ON HOOK and when the telephone is OFF HOOK and a second information path for passing the caller identification signals to indicator 50 when the telephone is ON HOOK. As will be explained in greater detail below, extension unit 30 has a bandpass filter and a detector for detecting gated ring tone signals 40 and when the gated ring tone signals are detected, a 170 peak-to-peak voltage signal having a 60 Hz frequency is gated to telephone 12 through a telephone interface. The second information path also passes first information signals 18 to telephone 12. The second detecting means activate the second information path when:

(1) telephone 12 is ON HOOK to pass gated ring tone signals 40 to the telephone, (2) telephone 12 is ON HOOK to pass caller identification signals 16 to indicator 50, and (3) telephone 12 is OFF HOOK to pass first information signals 18 to the telephone.

For the embodiment of the invention illustrated in FIG. 1, the second information path includes a coupler 52 by which extension unit 30 is matched to power line 24 to receive gated ring tone signals 40, caller identification signals 16, and first information signals 18 from the power line through outlet 27 and plug 36; a line receiver 54 which amplifies the gated ring tone signals, the caller identification signals, and the first information signals; a demodulator 56 at which the base carrier signal is demodulated to detect the gated ring tone signals, the caller identification signals, and the information signals; and a telephone interface 58 through which caller identification signals 16 are conducted to indicator 50 and by which the extension unit is matched to telephone 12 to conduct ring signals 14 and information signals 18 to the telephone through telephone jack 37. A power supply 60 provides power to the various component parts of extension unit 30.

Extension unit 30 further includes a third information path through which the second information signals 22 pass to power line 24. For the embodiment of the invention illustrated in FIG. 1, the third information path includes telephone interface 58, by which extension unit 30 is matched to telephone 12 to receive the second telephone signals from the telephone through telephone jack 37; a modulator 62 at which the extension carrier signal is modulated by the second telephone signals; a line driver 64 which amplifies the modulated extension carrier signal; and coupler 52 by which the extension unit is matched to power line 24 to conduct the amplified, modulated extension carrier signal through plug 36 and outlet 27 to the power line.

The second detecting means in extension unit 30 activate the third information path when the telephone is OFF HOOK to pass second information signals 22 to power line 24.

Base unit 28 further includes a fourth information path through which the second telephone signals pass to telephone line 10. For the embodiment of the invention illustrated in FIG. 1, the second information path includes coupler 46 by which base unit 28 is matched to power line 24 to receive the second telephone signals from the power line through outlet 26 and plug 34; a line receiver 66 which amplifies the second telephone signals; a demodulator 68 at which the extension carrier signal is demodulated to detect ON HOOK/OFF HOOK status signal 20 and second information signal 22; and telephone interface 41 through which the second telephone signals are conducted to telephone line 10 through telephone jack 32.

The first detecting means in base unit 28 activate the fourth information path when telephone 12 is OFF HOOK to pass second information signals 22 to telephone line 10.

Gated tone ring signals 40 are generated in a control logic circuit 70 in base unit 28 when ring signals 14 are detected in telephone interface 41. The gated ring tone signals can enter the first information path for passage to power line 24 either through telephone interface 41 or bypass the telephone interface entirely by being conducted directly to modulator 42 along an auxiliary path shown by dashed lines and identified by reference numeral 72.

Upon detection of a ring signal, control logic circuit 70 in base unit 28 also activates the first information path in the base unit by controlling modulator 42 to turn on the base carrier signal for modulation by the gated ring tone signal. At the completion of a ring signal 14, the gated ring tone signal generator is turned "off", while the base carrier signal is maintained "on" between the ring signals by a monostable multivibrator in control logic 70 which is triggered by the ring signal, thereby permitting caller identification signals 16 to modulate the base carrier and the modulated base carrier signal is conducted to power line 24.

The presence of gated ring tone signal 40 in extension unit 30 is detected by a control logic circuit 74 in the extension unit which receives, along a line 76 from demodulator 56, where the base carrier signal is demodulated to detect the gated ring tone signal, indications of the presence of the base carrier signal and, in particular, the presence of the gated ring tone signal.

The status of telephone 12, as indicated by ON HOOK/OFF HOOK status signal 20, is detected by telephone interface 58 in extension unit 30. When telephone 12 is ON HOOK, extension carrier signal 22 is "off" indicating ON HOOK status of the telephone. When telephone 12 is OFF HOOK, extension carrier signal 22 is turned "on" to indicate that the telephone is OFF HOOK. The detection of extension carrier signal 22 in base unit 28 by the presence of extension carrier 22 at demodulator 68 indicates the status of telephone 12 which is communicated via a line 80, control logic circuit 70, telephone interface 41, and telephone line 10 to the telephone central office. While telephone 12 in ON HOOK, telephone interface 41 of base unit 28, presents a high impedance to the telephone central office which represents the ON HOOK status of the telephone although the first information path is active and would otherwise indicate to the telephone central office that the telephone is OFF HOOK. When telephone 12 is OFF HOOK, telephone interface 41 presents a low impedance to the telephone central office which indicates the OFF HOOK status of the telephone. Regardless of the mode of operation of base unit 28, until the base unit detects the OFF HOOK status of telephone 12, telephone interface 41 presents a high impedance to the telephone central office.

when telephone 12 is OFF HOOK, control logic circuit 74 in extension unit 30 activates the second information path in the extension unit by controlling modulator 56 to turn on the extension carrier signal for modulation by the second information signals. The OFF HOOK status of telephone 12 is sensed by control logic circuit 70 in the base unit when the presence of the extension carrier signal in the fourth information path the base unit is detected. This, in turn, controls the telephone central office to cease transmission of ring signals 14 because telephone 12 is OFF HOOK. With ring signals 14 no longer being transmitted, no additional gated ring tone signals 40 are generated.

A second line 78, between modulator 56 and control logic circuit 74 in extension unit 30, activates the second information path between gated ring tone signals 40 to permit passage of caller identification signals 16 through telephone interface 58 and telephone jack 37 to indicator 50 because the presence of base carrier signal 18 between rings is detected by demodulator 56 and the presence of base carrier signal maintains the second information path active.

While in the foregoing there has been described a preferred embodiment of the present invention, it should be understood by those skilled in the art that various modifications and changes can be made without departing from the true spirit and scope of the present invention.

What is claimed:

1. A power line telephone communications system having ON HOOK digital voiceband messaging comprising:
   means for supplying:
   (a) first telephone signals transmitted from a telephone line and including:
      (1) ring signals indicating an incoming call to the telephone,
      (2) ON HOOK digital voiceband signals representative of selected information, and
      (3) first information signals representative of OFF HOOK communications from the telephone line, and
   (b) second telephone signals transmitted from the telephone and including:
      (1) ON HOOK/OFF HOOK status signals indicating the status of the telephone, and
      (2) second information signals representative of OFF HOOK communications from the telephone;
   a base unit for receiving said first telephone signals from the telephone line and including:
   (a) means responsive to said ring signals for generating a gated ring tone signal having a frequency at the upper end of the voiceband frequency range for each of said ring signals,
   (b) first detecting means responsive to said ON HOOK/OFF HOOK status signals for determining when the telephone is ON HOOK and when the telephone is OFF HOOK, and
   (c) a first information path responsive to said first detecting means for passing said gated ring tone signals, said ON HOOK digital voiceband signals, and said first information signals;
   a power line to which said base unit is connected and along which said gated ring tone signals, said ON HOOK digital voiceband signals, and said first information signals are transmitted for reception by the telephone and along which said second telephone signals are transmitted to said base unit for reception at the telephone line; and
   an extension unit connected between said power line and the telephone for receiving from said power line said gated ring tone signals, said ON HOOK digital voiceband signals, and said first information signals and for conducting to said power line said second telephone signals, said extension unit adapted for connection to an indicator which indicates said selected information of said ON HOOK digital voiceband signals and including:
   (a) second detecting means responsive to said ON HOOK/OFF HOOK status signals for determining when the telephone is ON HOOK and when the telephone is OFF HOOK, and
   (b) a second information path responsive to said second detecting means for passing said ON HOOK digital voiceband signals to the indicator when the telephone is ON HOOK.

2. A power line telephone communications system according to claim 1 wherein said first information path includes a telephone interface at which said first telephone signals are received and said first information path extends from said telephone interface to said power line.

3. A power line telephone communications system according to claims 1 wherein said first information path includes a telephone interface at which said first telephone signals are received and through which said ON HOOK digital voiceband signals, said first information signals, and said gated ring tone signals pass and said first information path extends from said telephone interface to said power line.

4. A power line telephone communications system according to claim 1 wherein said first information path includes:
   (a) a telephone interface at which said first telephone signals are received and through which said ON HOOK digital voiceband signals and said first information signals pass,
   (b) a modulator connected to said telephone interface and at which a carrier signal is modulated by said ON HOOK digital voiceband signals, said first information signals, and said gated ring tone signals, and
   (c) an auxiliary path for conducting said gated ring tone signals directly to said modulator from said gated ring tone signal generating means, and
   said first information path extends from said telephone interface to said power line.

5. A power line telephone communications system having ON HOOK digital voiceband messaging comprising:
   means for supplying:
   (a) first telephone signals transmitted from a telephone line for reception by a telephone, said first telephone signals including:
      (1) ring signals indicating an incoming call to the telephone,
      (2) ON HOOK digital voiceband signals occurring between the first and the second ring signals representative of selected information, and (3) first information signals representative of OFF HOOK communications from the telephone line, and (b) second telephone signals transmitted from the telephone for reception at the telephone line, said second telephone signals including:

(1) ON HOOK/OFF HOOK status signals indicating the status of the telephone, and (2) second information signals representative of OFF HOOK communications from the telephone;

a power line along which said first telephone signals are transmitted for reception by the telephone and said second telephone signals are transmitted for reception at the telephone line;

a base unit connected between the telephone line and said power line for conducting to said power line said first telephone signals and for receiving from said power line said second telephone signals, said base unit including:

(a) first detecting means responsive to said ON HOOK/OFF HOOK status signals for determining when the telephone is ON HOOK and when the telephone is OFF HOOK, and (b) a first information path responsive to said first detecting means for passing:

(1) said ring signals to said power line when the telephone is ON HOOK, (2) said ON HOOK digital voiceband signals to said power line when the telephone is ON HOOK, and (3) said first information signals to said power line when the telephone is OFF HOOK, (c) a second information path responsive to said first detecting means for passing:

(1) said ON HOOK/OFF HOOK status signals to the telephone line when the telephone is ON HOOK, (2) said ON HOOK/OFF HOOK status signals to the telephone line when the telephone is OFF HOOK, and (3) said second information signals to the telephone line when the telephone is OFF HOOK; and an extension unit connected between said power line and the telephone for receiving from said power line said first telephone signals and for conducting to said power line said second telephone signals, said extension unit adapted for connection to an indicator which indicates said selected information of said ON HOOK digital voiceband signals and including:

(a) second detecting means responsive to said ON HOOK/OFF HOOK status signals for determining when the telephone is ON HOOK and when the telephone is OFF HOOK, (b) a third information path responsive to said second detecting means for passing:

(1) said ON HOOK digital voiceband signals to the indicator when the telephone is ON HOOK, (2) said ring signals to the telephone when the telephone is ON HOOK, and (3) said first information signals to the telephone when the telephone is OFF HOOK, (c) a fourth information path responsive to said second detecting means for passing:

(1) said ON HOOK/OFF HOOK status signals to said power line when the telephone is ON HOOK, (2) said ON HOOK/OFF HOOK status signals to said power line when the telephone is OFF HOOK, and (3) said second information signals to said power line when the telephone is OFF HOOK.

6. A power line telephone communications system having ON HOOK digital voiceband messaging comprising:

means for supplying:

(a) first telephone signals transmitted from a telephone line and including:

(1) ring signals indicating an incoming call, (2) ON HOOK digital voiceband signals representative of selected information, and (3) first information signals representative of OFF HOOK communications from the telephone line, and (b) second telephone signals transmitted from the telephone and including:

(1) ON HOOK/OFF HOOK status signals indicating the status of the telephone, and (2) second information signals representative of OFF HOOK communications from the telephone;

a power line;

a base unit connected between the telephone line and said power line for conducting to said power line gated ring tone signals each having a frequency at the upper end of the voiceband frequency range, said ON HOOK digital voiceband signals and said first information signals and for receiving from said power line said second telephone signals, said base unit including:

(a) first detecting means responsive to said ON HOOK/OFF HOOK status signals for determining when the telephone is ON HOOK and when the telephone is OFF HOOK, (b) a first information path responsive to said first detecting means for passing said ON HOOK digital voiceband signals to said power line when the telephone is ON HOOK, and (c) means for generating a gated ring tone signal having a frequency at the upper end of the voiceband frequency range for each of said ring signals; and an extension unit connected between said power line and the telephone for receiving from said power line said gated ring tone signals, said ON HOOK digital voiceband signals and said first information signals and for conducting to said power line said second telephone signals, said extension unit adapted for connection to an indicator which indicates said selected information of said ON HOOK digital voiceband signals and including:

(a) second detecting means responsive to said ON HOOK/OFF HOOK status signals for determining when the telephone is ON HOOK and when the telephone is OFF HOOK, and (b) a second information path responsive to said second detecting means for passing said ON HOOK digital voiceband signals to the indicator when the telephone is ON HOOK.

7. A power line telephone communications system according to claim 6 wherein:

(a) said gated ring tone signals and said first information signals pass to said power line through said first information path, (b) said first detecting means activate said first information path when:

(1) the telephone is ON HOOK to pass said gated ring tone signals to said power line, and (2) the telephone is OFF HOOK to pass said first information signals to said power line, and (c) said second detecting means activate said second information path when:

(1) the telephone is ON HOOK to pass said gated ring tone signals to the telephone, and (2) the telephone is OFF HOOK to pass said first information signals to the telephone.

8. A power line telephone communications system according to claim 7 wherein:

(a) said extension unit further includes a third information path responsive to said second detecting means through which said second telephone signals pass to said power line, (b) said second detecting means activate said third information path when:

(1) the telephone is ON HOOK to pass said ON HOOK/OFF HOOK status signals to said power line, (2) the telephone is OFF HOOK to pass said ON HOOK/OFF HOOK status signals to said power line, and (3) the telephone is OFF HOOK to pass said second information signals to said power line, (c) said base unit further includes a fourth information path responsive to said first detecting means through which said second telephone signals pass to the telephone line, and (d) said first detecting means activate said fourth information path when:

(1) the telephone is ON HOOK to pass said ON HOOK/OFF HOOK status signals to the telephone line, (2) the telephone is OFF HOOK to pass said ON HOOK/OFF HOOK status signals to the telephone line, and (3) the telephone is OFF HOOK to pass said second information signals to the telephone line.

9. A power line telephone communications system according to claim 6 wherein said ON HOOK digital voiceband signals occur between the first and the second ring signals.

10. A power line telephone communications system according to claim 9 wherein the frequency of said gated ring tone signal is 3.5 KHz.

* * * * *